(12) United States Patent
Stewart, II

(10) Patent No.: US 6,768,465 B2
(45) Date of Patent: Jul. 27, 2004

(54) LOW PROBABILITY OF INTERCEPT (LPI) MILLIMETER WAVE BEACON

(75) Inventor: William L. Stewart, II, Benbrook, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 56 days.

(21) Appl. No.: 10/165,588

(22) Filed: Jun. 8, 2002

(65) Prior Publication Data

US 2003/0227412 A1 Dec. 11, 2003

Related U.S. Application Data

(60) Provisional application No. 60/317,750, filed on Sep. 6, 2001.

(51) Int. Cl.[7] ................................. H01Q 1/28
(52) U.S. Cl. ..................... 343/705; 343/583; 342/43
(58) Field of Search .................. 343/853, 795, 343/705, 708; 342/42, 43; 455/73, 91, 98; 244/3.1

(56) References Cited

U.S. PATENT DOCUMENTS

| | | | |
|---|---|---|---|
| 4,317,119 A | * | 2/1982 | Alvarez .................. 342/455 |
| 4,442,431 A | | 4/1984 | Bleakney |
| 5,218,360 A | | 6/1993 | Goetz et al. |
| 5,249,157 A | * | 9/1993 | Taylor .................. 340/903 |
| 5,344,099 A | | 9/1994 | Pittman et al. |
| 5,748,136 A | * | 5/1998 | Fischer .................. 342/33 |
| 6,614,012 B2 | * | 9/2003 | Schneider et al. ........ 244/3.1 |

FOREIGN PATENT DOCUMENTS

FR     2793885     11/2000

OTHER PUBLICATIONS

Stewart, W.L. II: *Passive Millimeter Wave Imaging Considerations for Tactical Aircraft*, 20th DASC. 20th Digital Avionics Systems Conference, Oct. 14–18, 2001.

\* cited by examiner

*Primary Examiner*—Tan Ho
(74) *Attorney, Agent, or Firm*—Bracewell & Patterson, L.L.P.

(57) ABSTRACT

A millimeter wave beacon includes a millimeter wave transmitter that produces at least one signal and plurality of antennas, coupled to the millimeter wave transmitter, that each emit millimeter wave radiation in response to the at least one signal. In one embodiment, the antennas are constructed and oriented to produce an overlapping signal field in which millimeter wave radiation emitted from multiple of the antennas can be detected. The millimeter wave radiation can be pulsed to encode various information of interest. Determination of the direction of approach to the beacon is facilitated by multiple antennas transmitting signals having different pulse encodings and/or different frequencies.

9 Claims, 9 Drawing Sheets

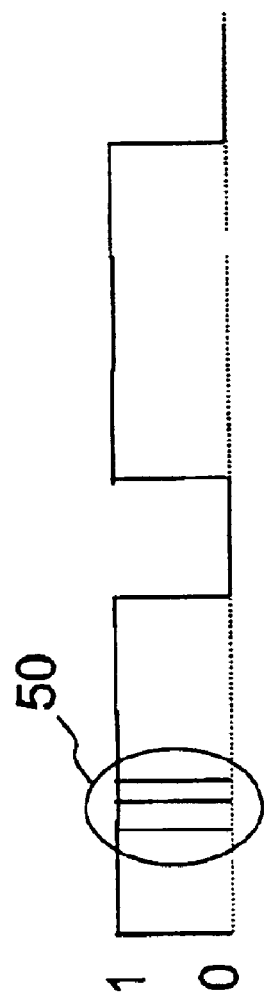
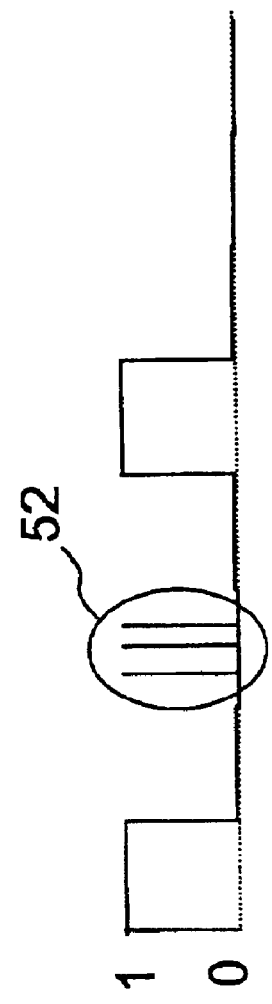
Fig. 8A
Fig. 8B

LOW PROBABILITY OF INTERCEPT (LPI) MILLIMETER WAVE BEACON

CROSS-REFERENCE TO RELATED APPLICATIONS

The present application claims priority to provisional patent application serial No. 60/317,750, filed Sep. 6, 2001.

BACKGROUND OF THE INVENTION

1. Technical Field

The present invention relates generally to millimeter wave energy emissions and, in particular, to the transmission of millimeter wave energy emissions by a beacon and the passive reception of millimeter wave energy emissions by a receiver.

2. Description of the Related Art

All materials at temperatures above absolute zero (0° K) radiate electromagnetic energy as a function of their temperatures. For terrestrial objects, this radiation, often referred to as "blackbody radiation," peaks in the infrared band at wavelengths of 5–25 microns and falls off rapidly at shorter wavelengths through the visible, ultraviolet, x-ray, gamma ray and cosmic ray spectrums. At longer wavelengths, through the far-infrared, submillimeter wave, and millimeter wave (MMW) spectrums, ambient radiation again falls off, but much less rapidly. Passive imaging at these wavelengths from ambient blackbody radiation is possible if radiation levels are sufficient for available detectors to detect and process.

As shown in FIG. 1, in the terrestrial environment, atmospheric gases and compounds such as water, carbon dioxide, and oxygen absorb blackbody radiation in much of the MMW spectrum to such an extent that observable signal strength is below detectable levels. However, as indicated at reference numerals 10 and 12, blackbody radiation at certain frequencies within the MMW spectrum can be detected with currently available MMW detectors due to decreased atmospheric absorption. In particular, observation windows for atmospheric blackbody radiation are present at approximately 35, 95, 140, and 220 GHz.

MMW detection and imaging are similar to conventional infrared imaging in that the received signal strength observed utilizing each technology is a function of the temperature of the elements composing the observed scene. Thus, the observation of an object through detection of its blackbody radiation depends upon the existence of a sufficient temperature contrast with the surrounding environment. As depicted in FIG. 2, terrestrial MMW temperatures range from approximately 30° K to 300° K, with the coldest temperatures within a cone of approximately 40° centered on the zenith and the warmer temperatures produced by the surrounding terrestrial environment. This large temperature differential of 270° K provides sufficiently high contrast for MMW detection and imaging. Although there is some solar heating, it should be noted that this temperature differential is relatively independent of sunlight and therefore present during both day and night observations.

Currently, several companies, such as TRW of Redondo Beach, Calif. and Thermo Trex Corporation of San Diego, Calif., manufacture passive MMW cameras for applications such as all weather aircraft take-off and landing, airborne surveillance and reconnaissance through fog, cloud, dust, smoke and camouflage, concealed weapon detection, vehicle navigation, and other applications where enhanced vision is desired. Although promising because of the low attenuation of MMW versus higher frequency radiation (e.g., IR), MMW camera technologies are subject to inherent limitations in image resolution and angular resolution due to the relatively longer wavelengths of MMW radiation. Consequently, the present invention recognizes that a need exists for an improved method and system for determining the presence and location of an object within a field of interest by detecting its MMW signature.

SUMMARY OF THE INVENTION

In view of the foregoing and additional needs recognized by the present invention, object detection from millimeter wave emissions is enhanced by incorporating a millimeter wave beacon within an object of interest. In accordance with the present invention, the millimeter wave beacon includes a millimeter wave transmitter that generates at least one signal, and a plurality of antennas, coupled to the millimeter wave transmitter, that each emit millimeter wave radiation in response to the signal(s) generated by the millimeter wave transmitter. In one embodiment, the antennas are constructed and oriented to produce an overlapping signal field in which millimeter wave radiation emitted from multiple of the antennas can be detected. The millimeter wave radiation can be pulsed to encode various information of interest. Determination of the direction of approach to the beacon is facilitated by multiple antennas transmitting signals having different pulse encodings or different frequencies.

Additional objects, features, and advantages of the present invention will become apparent from the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 8A and 8B illustrate the encoding of digital information within a MMW transmission by a LPI MMW beacon in accordance with the present invention;

DETAILED DESCRIPTION OF AN ILLUSTRATIVE EMBODIMENT

Figure 1:
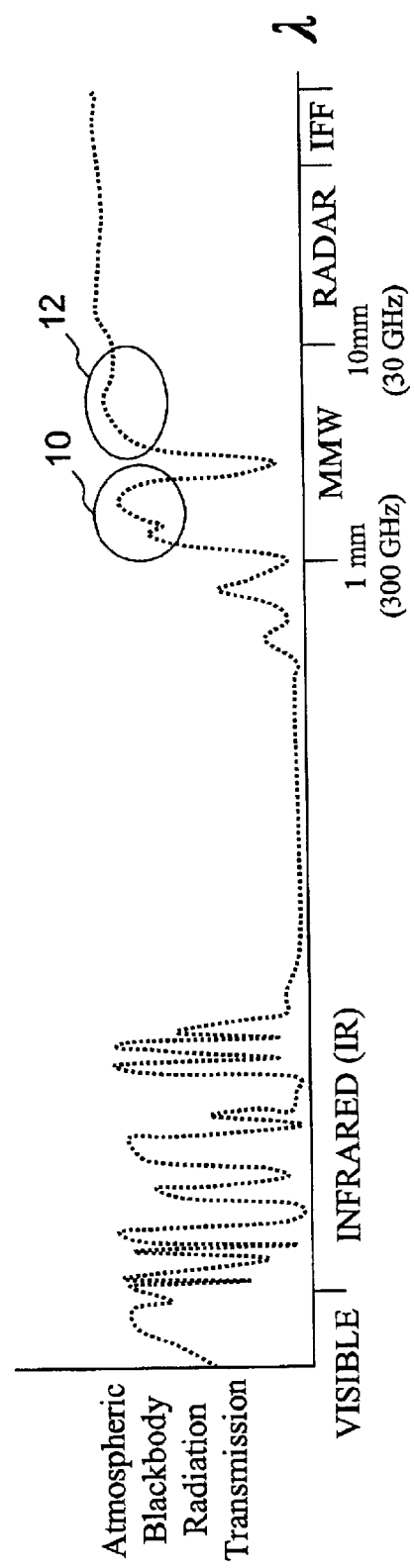
FIG. 1 depicts the atmospheric transmission of blackbody radiation as a function of wavelength, illustrating the effects of atmospheric absorption of blackbody radiation by water, oxygen and carbon dioxide.
Figure 2:
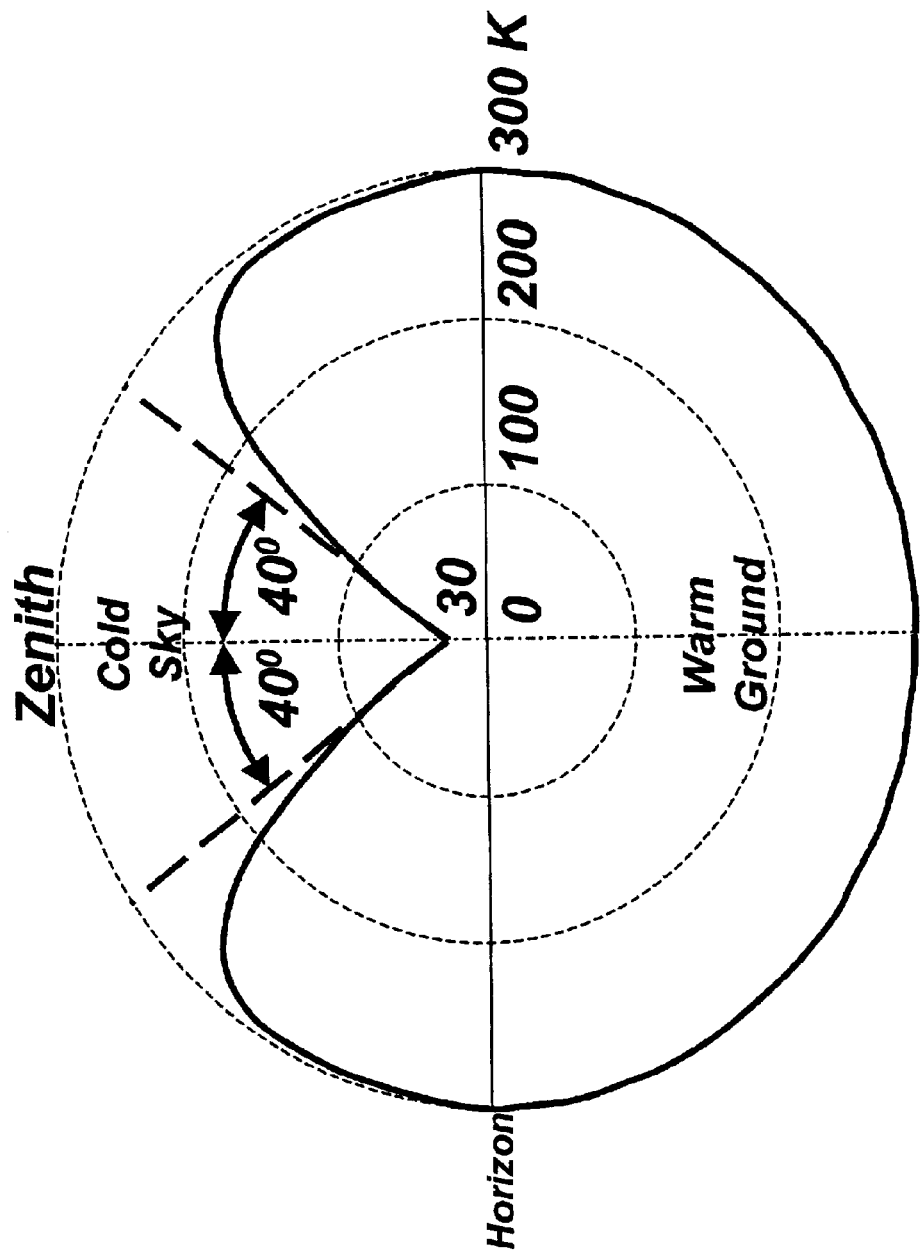
FIG. 2 illustrates a terrestrial millimeter wave (MMW) temperature sphere depicting the observed temperature differential between the sky and ground.
Figure 3:
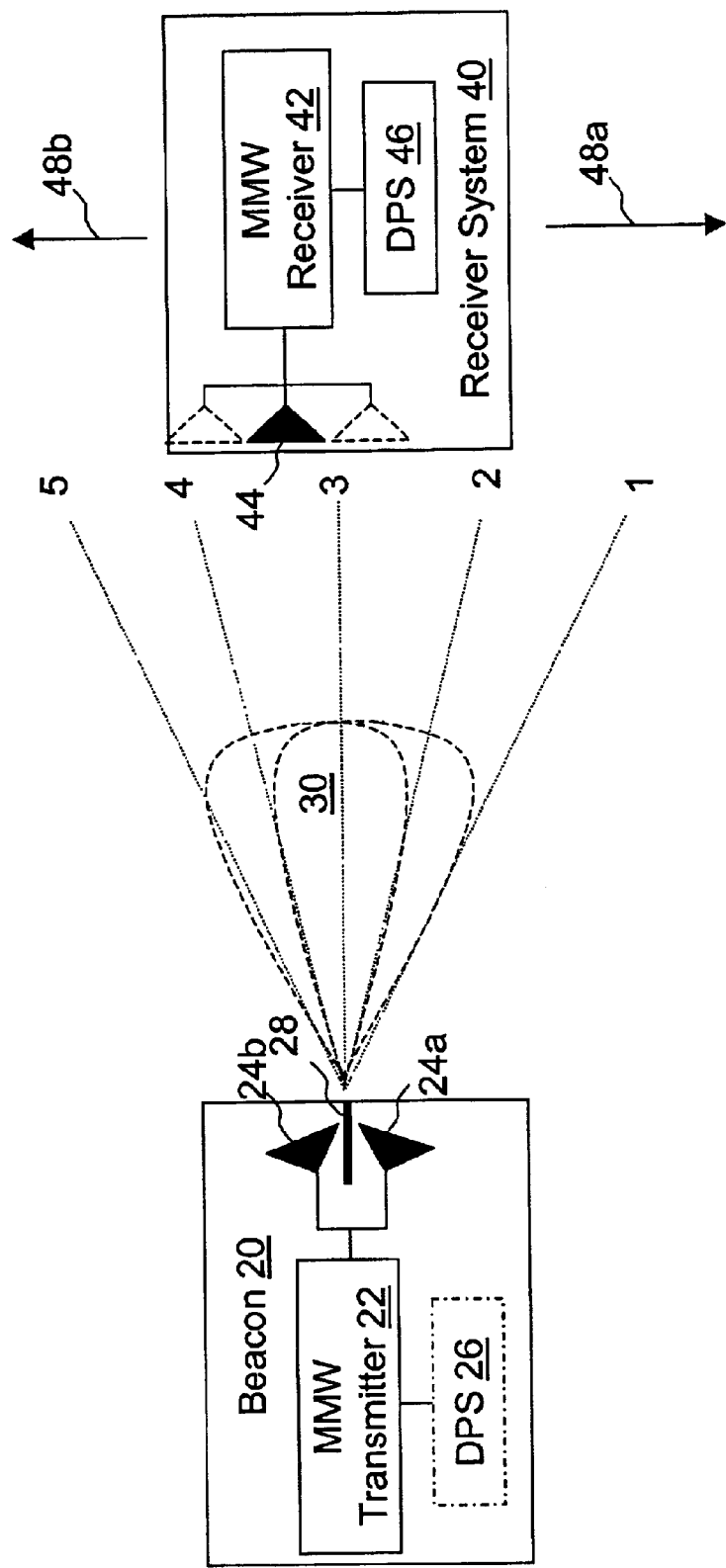
FIG. 3 depicts a low probability of intercept (LPI) MMW beacon and passive MMW receiving system in accordance with the present invention.

With reference again to the figures and in particular with reference to FIG. 3, a millimeter wave (MMW) beacon and MMW receiver system in accordance with the present invention are illustrated. As illustrated, beacon 20 includes a MMW transmitter 22 coupled to two or more antennas, which in the illustrated embodiment include antennas 24a–24b disposed on opposing sides of antenna ground plane 28. MMW transmitter 22 outputs one or more signals to antennas 24, which in response emit MMW radiation having a frequency or frequencies between approximately 30 and 300 GHz and signal pulse duration(s) determined by the signal(s) output by transmitter 22. As illustrated, in a preferred embodiment, at least two antennas 24 are constructed and oriented to produce an overlapping signal field 30 in which a MMW receiver such as receiver system 40 can concurrently detect MMW radiation emitted from multiple antennas 24.

As will become apparent from the description provided below, beacon 20 may be implemented as either a stationary beacon, for example, marking a vehicle path such as an aircraft runway, landing pad or vehicle roadway, or as a mobile beacon, for example, incorporated within an aircraft. In military implementations in which it is desirable to avoid enemy observation, low probability of intercept (LPI) can be achieved by use of low transmitted power from beacon 20 and a directional aperture (e.g., a horn antenna), as well as the inherent high path loss for extra high frequency signals. Because it is entirely passive, the cooperating receiver system 40 similarly has a LPI.

As indicated, beacon 20 may further include a data processing system (DPS) 26 to control the operation of MMW transmitter 22, for example, by varying the number, type, frequency and signal pulse duration of the signal(s) output by MMW transmitter 22. DPS 26 may be implemented with, for example, a general purpose computer, an aircraft's avionics computer, or special purpose hardwired circuitry.

Still referring to FIG. 3, receiver system 40, which may comprise a MMW camera or simply a MMW detector or detectors, includes one or more antennas 44 coupled to a MMW receiver 42. Antenna(s) 44 sense ambient MMW radiation, including that emitted by beacon 20, and provide corresponding electrical signals to MMW receiver 42. MMW receiver 42 may in turn provide electrical signals to DPS 46 corresponding to the sensed MMW radiation to initiate additional processing (e.g., generating a graphical image corresponding to the detected MMW radiation).

As illustrated in FIG. 3 by arrows 48a and 48b, receiver system 40 can preferably be moved at least in a geometric plane orthogonal to antenna ground plane 28 of beacon 20 to permit receiver system 40 to receive MMW radiation emitted by multiple antennas 24. By moving receiver system 40 relative to beacon 20 through the fields of antennas 24a and 24b, which overlap within overlapping signal field 30, the relative attitude of any plane or planes of interest on beacon 20 can be determined by receiver system 40.

Figure 4A:
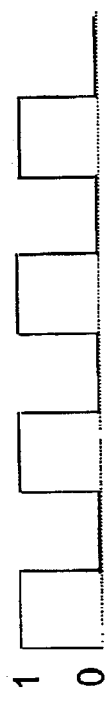
FIGS. 4A and 4B illustrate the MMW signals transmitted from antennas 24a and 24b, respectively, of the LPI MMW beacon shown in FIG. 3 according to one embodiment of the present invention.
Figure 4B:
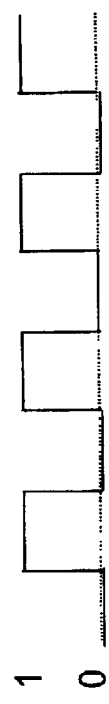

For example, with reference now to FIGS. 4A and 4B, there are illustrated exemplary MMW signals transmitted by MMW transmitter 22 via antennas 24a and 24b, respectively. As shown, in the depicted embodiment MMW transmitter 22 alternately energizes antennas 24a and 24b to create alternating pulses each having a duration, for example, between 0.5–10 s and more preferably in the range of 1–4 s. This pulse duration advantageously permits a human user of receiver system 40 to visually detect beacon 20 by monitoring a graphical display corresponding to the received signal by data processing system 46.

Figure 5A:
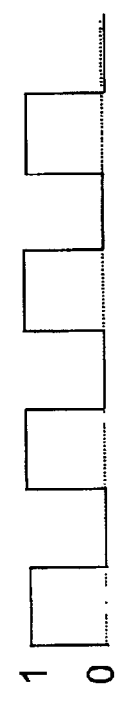
FIGS. 5A–5E depict the MMW signals received by the receiver system of FIG. 3 at positions 1 through 5, respectively, given the transmission of the MMW signals shown in FIGS. 4A and 4B.
Figure 5B:
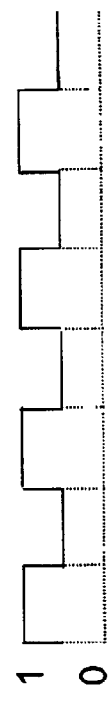
Figure 5C:
Figure 5D:
Figure 5E:
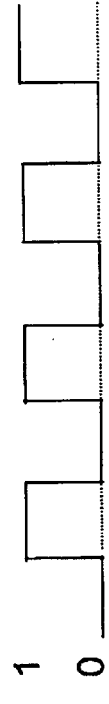

As receiver system 40 moves from position 1 to position 3 of FIG. 3, receiver system 40 detects energy first from only antenna 24a as shown in FIG. 5A, then from antenna 24a and, to a lesser extent, antenna 24b as shown in FIG. 5B, and then from both antennas 24a and 24b at similar levels as shown in FIG. 5C. Receiving approximately equal signals at position 3 would indicate that the centerline of antenna ground plane 28 has been located. The reverse signal pattern would then be observed if receiver system 40 is moved from position 3 to position 5, as depicted in FIGS. 5D and 5E, which correspond to positions 4 and 5, respectively.

Thus, by moving receiver system 40 (e.g., by steering a vehicle incorporating receiver system 40) until the signal illustrated in FIG. 5C is received, a geometric plane of interest (e.g., the geometric plane including antenna ground plane 28) can be located. A second orthogonal plane of interest can similarly be located by implementing within beacon 20 additional opposed antennas 24 having a ground plane orthogonal to ground plane 28. Of course, any other additional arbitrary plane of interest can similarly be located utilizing the same technique.

The location of a geometric plane(s) of interest may alternatively or additionally be assisted by transmitting one or more MMW signals from antennas 24 at different frequencies. For example, antenna 24a may transmit a MMW signal at a frequency between approximately 210–230 GHz, while antenna 24b may transmit the same or a different MMW signal at a frequency between 80–100 GHz. Alternatively or additionally, the antennas 24 on different geometric planes of interest can transmit at different frequencies so that receiver system 40 can determine its relative attitude to multiple planes of interest. If receiver system 40 is implemented as a MMW camera having a connected display that presents different MMW frequencies utilizing different colors, the use of multiple frequencies also allows for a human viewer associated with receiver system 40 to easily visually distinguish between various planes of interest on beacon 20.

It should be noted that the selection of the frequency band(s) at which antennas 24 transmit represents an engineering choice dictated by the material penetration of the MMW radiation, the detection resolution, and signal attenuation. In particular, lower frequency MMW radiation has greater material penetration, less resolution and less attenuation (i.e., higher probability of intercept). Higher frequency MMW radiation, by contrast, has less material penetration, greater possible resolution and more attenuation (i.e., lower probability of intercept).

The MMW signals emitted by beacon 20 can also be utilized to indicate to receiver system 40 the direction from which receiver system 40 is approaching beacon 20. For example, if beacon 20 and receiver system 40 have synchronized clock sources (e.g., atomic clock signal or Global Positioning System (GPS) time stamp), receiver system 40 can determine by reference to the timing between a received MMW signal and the synchronized clock source whether receiver system 40 is receiving the MMW signal from antenna 24a and 24b.

Figure 6A:
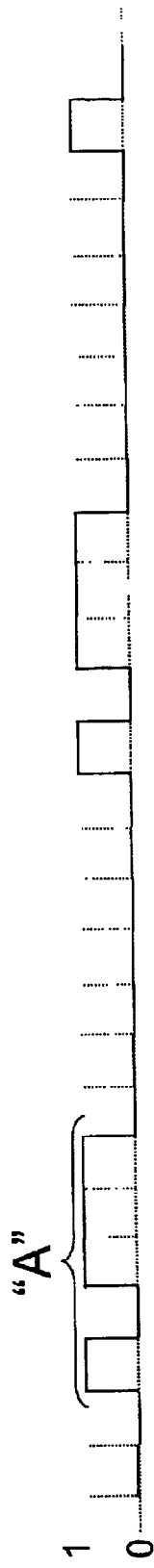
FIGS. 6A and 6B illustrate the MMW signals transmitted from antennas 24a and 24b, respectively, of the LPI MMW beacon shown in FIG. 3 and received at positions 1 and 5, respectively, according to another embodiment of the present invention.
Figure 6B:
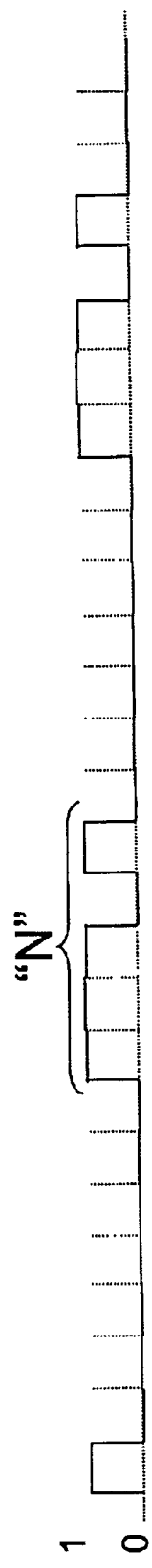
Figure 7:
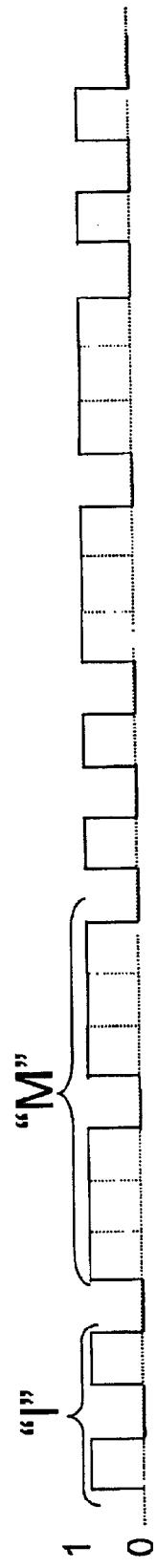
FIG. 7 depicts the MMW signal received by the receiving system of FIG. 3 at position 3 given the transmission of the MMW signals shown in FIGS. 6A and 6B.

Alternatively, as depicted in FIGS. 6A–6B, beacon 20 may also indicate the direction of approach by pulse coding the MMW emissions of antennas 24. For example, MMW transmitter 22 of beacon 20 may transmit the pulse-coded MMW signal shown in FIG. 6A (e.g., Morse Code for the letter "A") via antenna 24a and the pulse-coded MMW signal shown in FIG. 6B (e.g., Morse Code for the letter "N") via antenna 24b. As above, the minimum pulse duration is preferably on the order of 0.5–10 s and, more preferably, between 1–4 s.

Consequently, receiver system 40 will receive the MMW signal illustrated in FIG. 6A if approaching beacon 20 from position 1 and the MMW signal depicted in FIG. 6B if approaching beacon 20 from position 5. If approaching from position 3, receiver system 40 will receive a combination of the two signals (e.g., Morse Code for the letters "I" and "M"), again indicating approach within a desired geometric plane (i.e., the geometric plane including antenna ground plane 28).

Referring now to FIGS. 8A and 8B, timing diagrams are depicted that illustrate coded digital information embedded within the MMW signal transmissions of beacon 20. While the pulses illustrated in FIGS. 4A–4B and 6A–6B may have durations on an order of second(s), shorter pulses (or other modulation techniques such as phase modulation or spread spectrum) on the order of milliseconds or microseconds can be encoded as dropouts during a pulse as shown at reference numeral 50 of FIG. 8A or inserted between pulses as shown at reference numeral 52 of FIG. 8B. This coded digital information may include, for example, beacon call sign, Identify Friend or Foe (IFF), heading, airspeed, GPS position, timestamp, and/or other information that assists receiver system 40 in identifying, locating and/or tracking beacon 20.

Figure 9A:
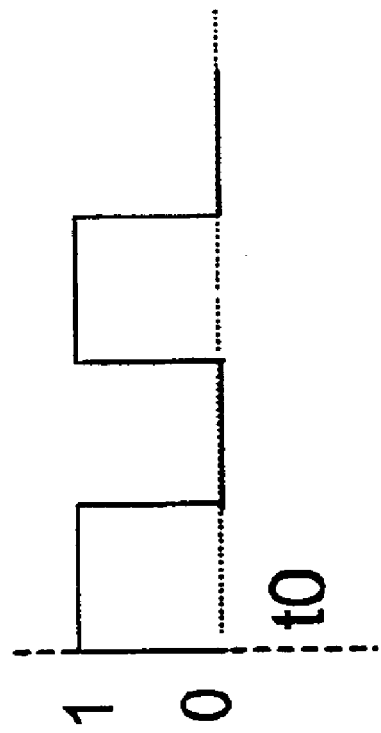
FIGS. 9A and 9B depict the passive determination of distance between a LPI MMW beacon and a receiving system utilizing time difference of arrival (TDOA)
Figure 9B:
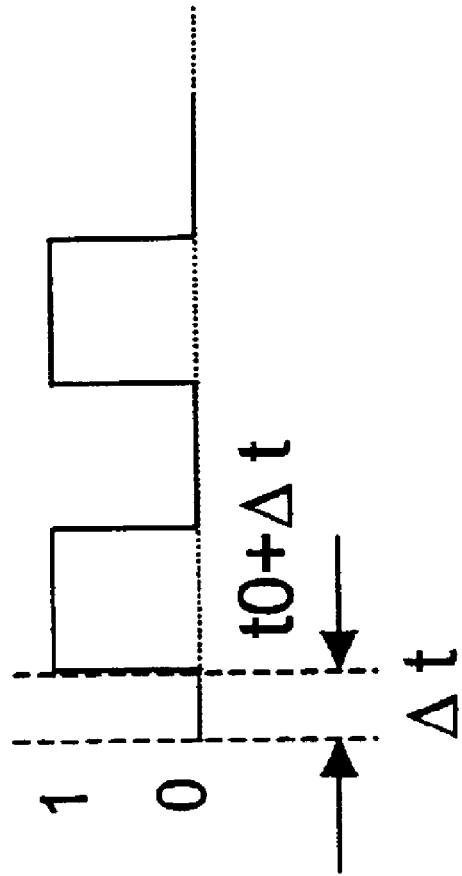

With reference now to FIGS. 9A and 9B, if GPS, atomic clock, or other accurate time reference is available to both beacon 20 and receiver system 40, the time difference of arrival (TDOA) between beacon 20 and receiver system 40, and thus the distance between beacon 20 and receiver system 40, can be determined. For example, FIG. 9A illustrates the transmission of a MMW pulse by beacon 20 at time t0. If the MMW pulse is received by receiver system 40 at time t0+Δt as depicted in FIG. 9B and the transmission time (t0), processing time and the relative velocities of the platforms is known, the TDOA, Δt, which represents the transmission path delay between pulse transmission and reception can be used by DPS 46 of receiver system 40 to calculate the distance between beacon 20 and receiver system 40.

Figure 10:
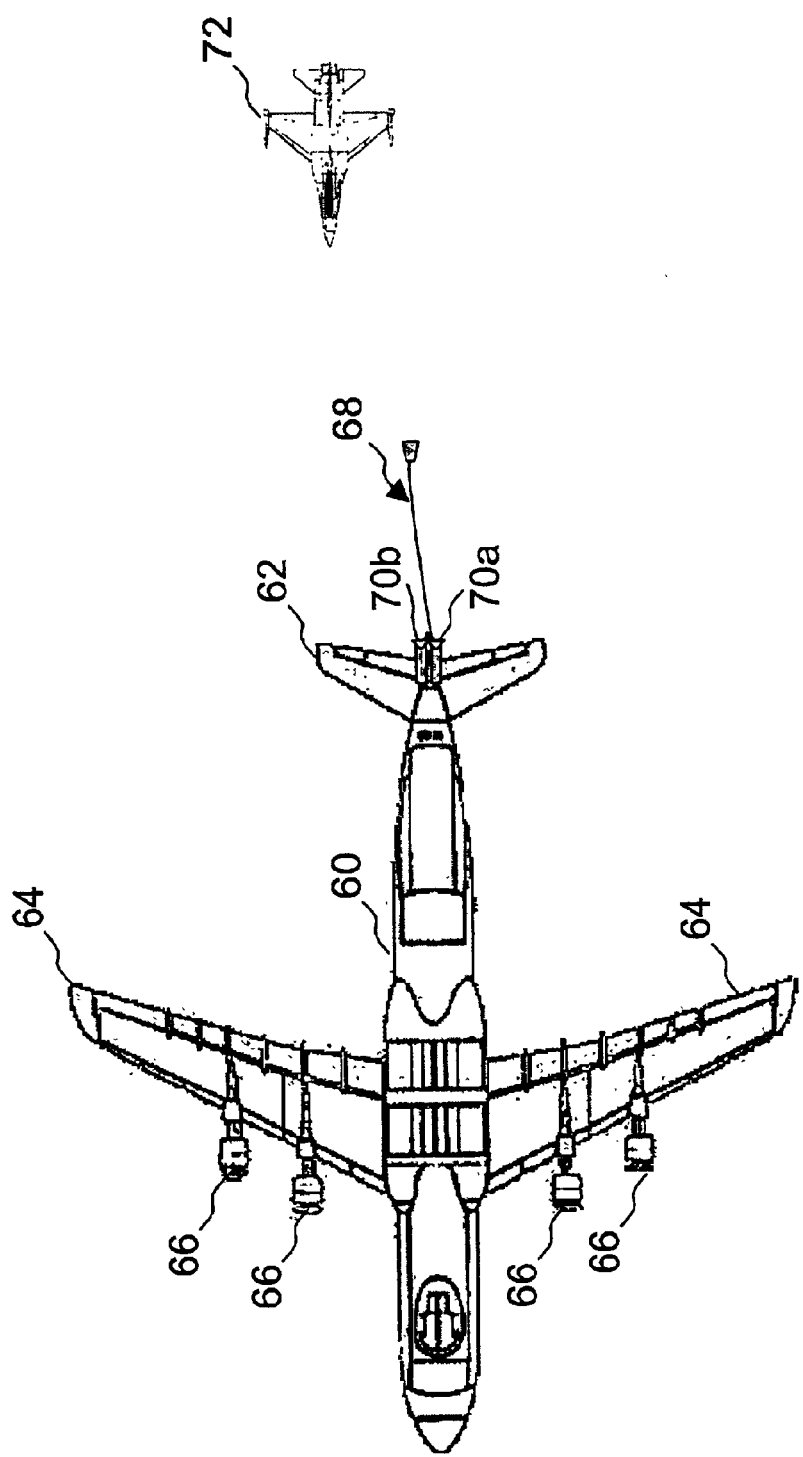
FIG. 10 depicts air-to-air beacon acquisition in accordance with the present invention.

A MMW beacon in accordance with the present invention has several possible applications, including applications within mobile and stationary platforms. For example, a MMW beacon may be installed within combat aircraft, for example, the aircraft of a flight leader, to enable wingmen to more easily maintain flight formations or reform flight formations after a mission. Similarly, as shown in detail in FIG. 10, an air-to-air refueling tanker comprising a fuselage 60, empennage 62, wings 64, engines 66 and probe-and-drogue refueling system 68, may have a beacon including antennas 70a and 70b installed on empennage 62 to permit another aircraft 72 having a cooperating MMW receiver system to more easily rendezvous for refueling. Other applications within mobile platforms include autonomous flight formation and automatic airborne collision avoidance.

Figure 11:
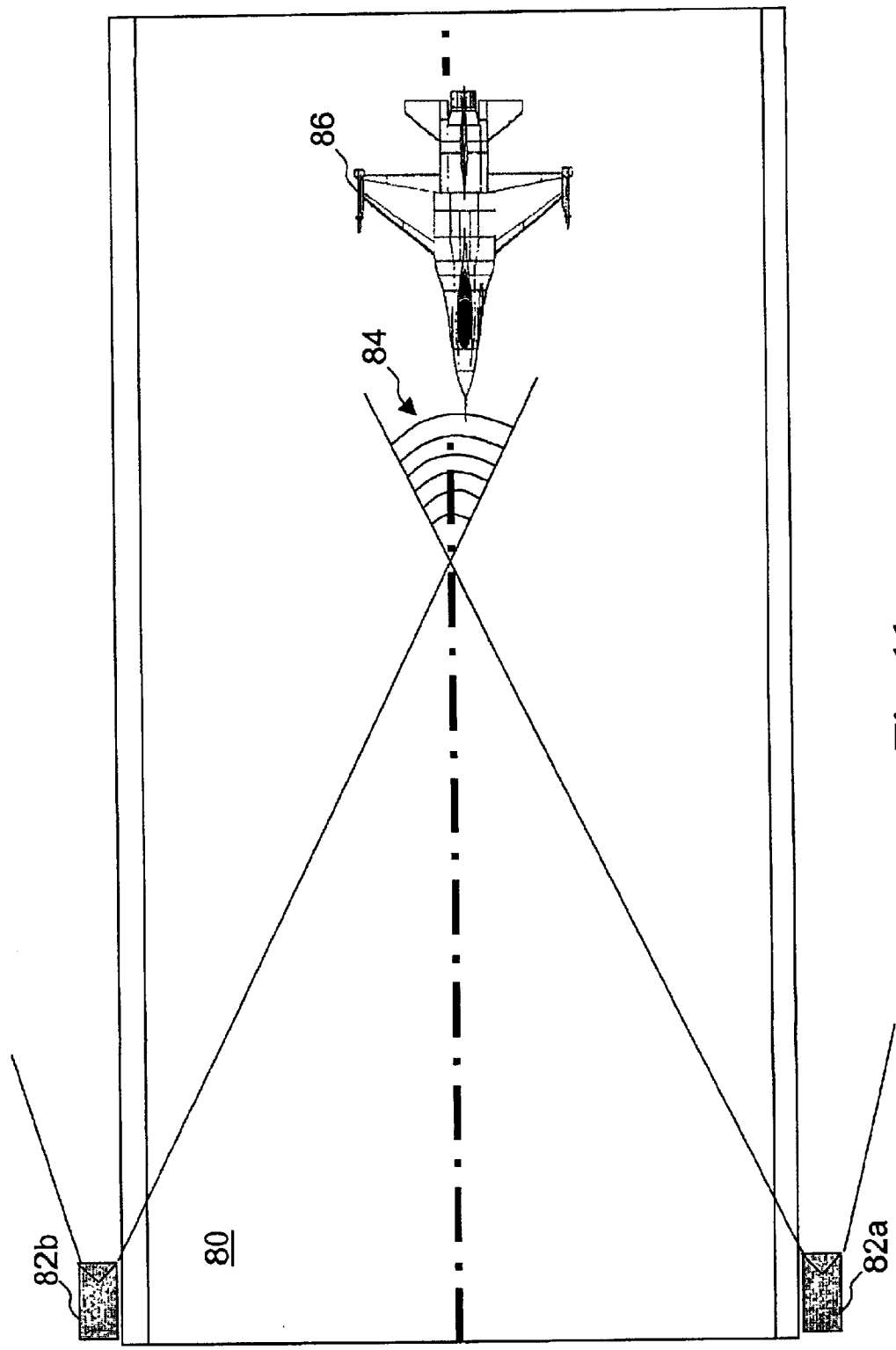
FIG. 11 illustrates air-to-ground beacon acquisition in accordance with the present invention.

MMW beacons can also be installed in stationary platforms, for example, as a runway localizer, downed pilot locator, drop zone identifier, or target designator. FIG. 11 depicts the use of a MMW beacon as a runway localizer. In the depicted embodiment, a runway 80 is flanked by two MMW antennas 82a and 82b emitting MMW radiation that overlaps within overlapping signal field 84. Utilizing the techniques described above, an aircraft 86 having a cooperating MMW receiver system installed therein can determine when aircraft 86 has achieved alignment with runway 80, even in conditions when visibility is obscured by fog, dust, smoke or cloud. Additional MMW antennas may of course be employed by the MMW beacon to identify additional planes of interest (e.g., glide slope).

As has been described, the present invention provides a LPI MMW beacon that enables a MMW receiver system to passively detect the MMW beacon and optionally its direction of approach and distance-to-intercept. While the invention has been particularly shown and described with reference to a preferred embodiment, it will be understood by those skilled in the art that various changes in form and detail may be made therein without departing from the spirit and scope of the invention.

What is claimed is:

1. A millimeter wave beacon, comprising:
   a millimeter wave transmitter that produces a plurality of different signals having different signal characteristics, wherein said plurality of signals have periods of between 0.5 seconds and ten seconds; and
   a plurality of antennas each coupled to the millimeter wave transmitter to receive a respective one of said plurality of different signals and emit millimeter wave radiation in response thereto, wherein antennas within said plurality are oriented to produce an overlapping signal field in which millimeter wave radiation emitted from multiple of said plurality of antennas is present.

2. The millimeter wave beacon of claim 1, wherein said transmitter transmits to at least a first antenna among the plurality of antennas a composite signal formed by superimposing a data overlay signal having a period of less than 0.5 seconds on a base signal having a period of between 0.5 and ten seconds, and wherein the first antenna emits millimeter wave radiation in response to the composite signal.

3. The millimeter wave beacon of claim 1, wherein at least two of said plurality of different signals encode information utilizing pulse coding.

4. The millimeter wave beacon of claim 1, wherein at least two of said antennas emit millimeter wave radiation at different frequencies.

5. A system, comprising:
   the millimeter wave beacon of claim 1; and
   a millimeter wave receiving system for receiving said millimeter wave radiation emitted from said plurality of antennas.

6. An aircraft, comprising:
   a fuselage;
   an empennage connected to the fuselage;
   a lift-generating surface coupled to the fuselage;
   at least one engine for propelling the aircraft coupled to at least one of the fuselage and the lift-generating surface; and a millimeter wave beacon, including:
- a millimeter wave transmitter that produces a plurality of different signals having different signal characteristics, wherein said plurality of different signals have periods of between 0.5 seconds and ten seconds; and
- a plurality of antennas each coupled to the millimeter wave transmitter to receive a respective one of said plurality of different signals and emit millimeter wave radiation in response thereto, wherein antennas within said plurality are oriented to produce an overlapping signal field in which millimeter wave radiation emitted from multiple of said plurality of antennas is present.

7. The aircraft of claim 6, wherein said transmitter transmits to at least a first antenna among the plurality of antennas a composite signal formed by superimposing a data overlay signal having a period of less than 0.5 seconds on a base signal having a period of between 0.5 and ten seconds, and wherein the first antenna emits millimeter wave radiation in response to the composite signal.

8. The aircraft of claim 6, wherein at least two of said plurality of different signals encode information utilizing pulse coding.

9. The aircraft of claim 6, wherein at least two of said antennas emit millimeter wave radiation at different frequencies.

* * * * *